Jan. 24, 1956 J. STRINDLUND 2,732,081
ROTARY SUCTION FILTER DRUM
Filed Feb. 19, 1953
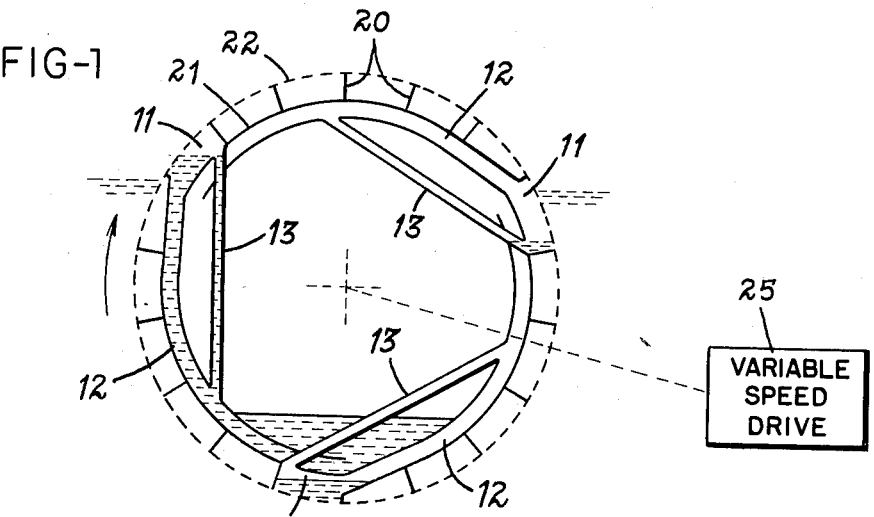
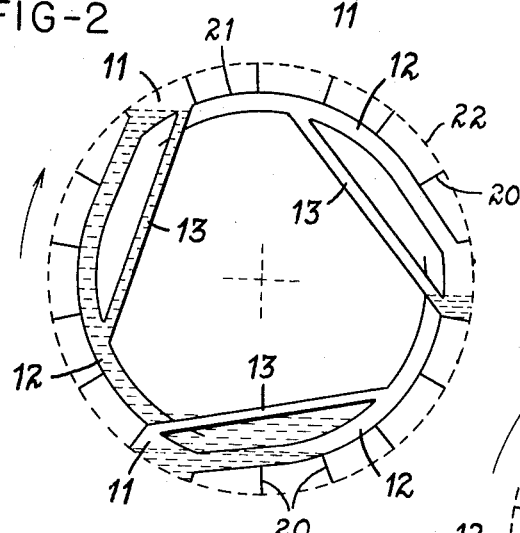
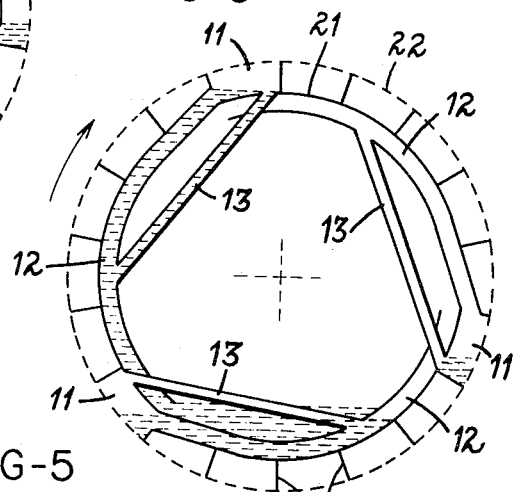
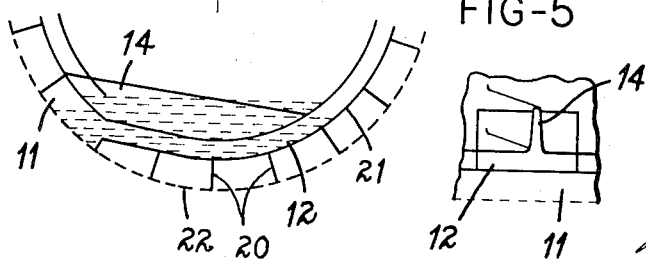
INVENTOR.
JOHN STRINDLUND
BY
Marechal Biebel French & Bugg
ATTORNEYS

United States Patent Office 2,732,081
Patented Jan. 24, 1956

2,732,081
ROTARY SUCTION FILTER DRUM

John Strindlund, Upsala, Sweden, assignor to The Black-Clawson Company, Hamilton, Ohio, a corporation of Ohio Application February 19, 1953, Serial No. 337,826

5 Claims. (Cl. 210—202)

The present invention relates to rotary suction filters of the type including a cylindrical casing, a cylindrical strainer disposed in spaced relation to the outer surface of the casing, a circumferential row of longitudinally extending cells between the casing and the strainer, outlets in the casing leading from each one of the cells, and rearwardly bent discharge ducts connecting the outlets with the interior of the drum.

The primary object of the invention is to promote the filling of the discharge ducts with liquid from the cells in order to enable the rapid formation of a vacuum in the cells when the ducts are comparatively long and the interior liquid level is low.

In accordance with the invention, air is admitted into the cells during their rising movement in such manner that the discharge ducts will not be closed by the liquid until they contain a sufficient amount of water to maintain a vacuum in the cells continuously until the outlet ends of the ducts have reached below the interior liquid level.

Other objects and advantages of the invention will be apparent from the following description, the accompanying drawings and the appended claims.

In the drawings—

Figs. 1, 2 and 3 are diagrammatic showings in radial section of a filter drum according to the invention and in three different angular positions, respectively;

Fig. 4 is a fragmentary view similar to Figs. 1–3 showing another form of filter drum in accordance with the invention; and Fig. 5 is a fragmentary view looking from left to right in Fig. 4.

Referring now to Figs. 1, 2 and 3, the filter drum is provided with multiple cells 11 formed by walls 20 between the cylindrical casing 21 and the cylindrical strainer 22. Each one of these cells has a discharge duct 12 which is bent rearwardly as seen in the direction of rotation. Three such ducts are shown in the drawing, and each such duct 12 extends in part through the subsequent cell. The cells are preferably made so large that they will not be completely filled with straining liquid in their lowermost position in order to prevent formation of a counter-pressure by liquid rising through the discharge duct.

To obviate blocking of its discharge duct 12 before a sufficient amount of liquid is contained therein to maintain a vacuum in the cell all the time until the outlet end of the duct will have reached below the interior liquid level, each cell 11 is connected by a pipe 13 with the rear portion of the corresponding discharge duct 12, the pipe 13 opening at its forward end into its associated cell 11 near the forward wall 20 defining such cell and having its opposite end opening into the associated duct 12 at a position in advance of the discharge end of the duct. Thus each pipe 13 forms with its associated cell and discharge duct a configuration approximating the shape of a capital letter D. In operation, this pipe causes air to be admitted into the cell at the same time as the liquid from this cell is flowing freely into the discharge duct until this liquid closes the end of pipe 13, after which a stable vacuum is formed and will increase as the drum rotates.

Referring to Fig. 1, a cell 11 is shown near its lowermost position in which, due to the dimensions of the cell as mentioned above, it is not completely filled with water. In the showing of Fig. 2, the same cell has moved a small amount in the direction of rotation of the drum, and the duct opening is completely closed by liquid. During the continued rotation of the drum air enters cell 11 through pipe 13, and at the same time some more liquid flows over from the cell to the duct, and this condition will remain until pipe 13 will have reached the position shown in Fig. 3 in which the liquid in duct 12 closes the pipe opening. The continued filling of the discharge duct takes place with the liquid continuously admitted through the strainer 22 into the cell and therefrom to the duct, and is supported by the expansion of the air trapped in the cell due to the continuously increasing vacuum.

Important advantages of this construction includes that the length of the suction duct may be increased, that the interior liquid level may be kept low, that the vacuum in the cells cannot be disturbed, and that the discharge of the cells may occur rapidly. Also, each pipe 13 may be of small diameter since the rate of air flow may be high.

Instead of a pipe 13 for the air admission into the cell, the discharge ducts may be provided with a hollow bead 14 as shown in Figs. 4 and 5. Such bead should be set at such an angle as to guide the discharging liquid to the exit and keep the interior liquid level low. The partitions between the cells should suitably be radial and may extend in the direction of the generatrix of the drum, or they may extend at a small angle forwardly from the outlet, as shown, in the direction of rotation of the drum. Control of the capacity of the apparatus may suitably be carried out by varying the rotational speed of the drum in such a manner that the interior liquid level will be kept substantially constant, as by means of a variable speed drive indicated diagrammatically at 25 in Fig. 1, and the controlling impulse will then be obtained from the liquid level in the vessel in which the drum is immersed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A rotary suction filter drum including a cylindrical casing, a cylindrical strainer disposed in spaced relation to the outer surface of said casing, a circumferential row of longitudinally extending cells between said casing and said strainer, outlets in said casing leading from each one of said cells, rearwardly bent discharge ducts connecting said outlets with the interior of said drum and each extending in part through the subsequent said cell, and means for admitting air into said cells during the rising period of the movement of said cells in such manner that the discharge ducts will not be blocked until a sufficient amount of liquid will have accumulated therein to maintain a vacuum in said cells all the time until the outlet ends of said ducts have reached below the interior liquid level, said last named means comprising a conduit connecting each said cell with the rear portion of the corresponding discharge duct in such manner that during rotation of said drum, air is admitted into said cell through said conduit at the same time as liquid from said cell flows freely into said discharge duct until said liquid closes the outlet of said conduit into said discharge duct.

2. A rotary suction filter drum as claimed in claim 1 characterized in that said conduit comprises a hollow bead formed on said discharge duct.

3. A rotary suction filter drum as claimed in claim 2 characterized in that said bead is set at an angle relative to the direction of flow of the filtering medium.

4. A rotary suction filter drum as claimed in claim 1 characterized in that means are provided for controlling the capacity of said filter by variation of the rotational speed of said drum in such manner that the interior liquid level will be kept substantially constant, and in that the controlling impulse is obtained from the liquid level in the vessel in which said drum is immersed.

5. A rotary suction filter including a cylindrical casing, a cylindrical strainer disposed in spaced relation to the outer surface of said casing, a circumferential row of longitudinally extending cells between said casing and said strainer, outlets in said casing leading from each of said cells, rearwardly bent discharge ducts connecting said outlets with the interior of said drum, and means forming a flow passage extending inwardly of said casing from each said cell to a rearward portion of the associated said discharge duct for transmission of air between said cell and the discharge end of said duct during collection of liquid in said cell and the forward portion of said duct.

References Cited in the file of this patent

UNITED STATES PATENTS 1,816,132    Strindlund  ------------  July 28, 1931